Nov. 24, 1953  E. J. LOMAZZO  2,660,243
V BELT CUTTING MACHINE
Filed May 16, 1951  5 Sheets-Sheet 1

Inventor
Edmund J. Lomazzo
By
Johnson and Kline
Attorneys

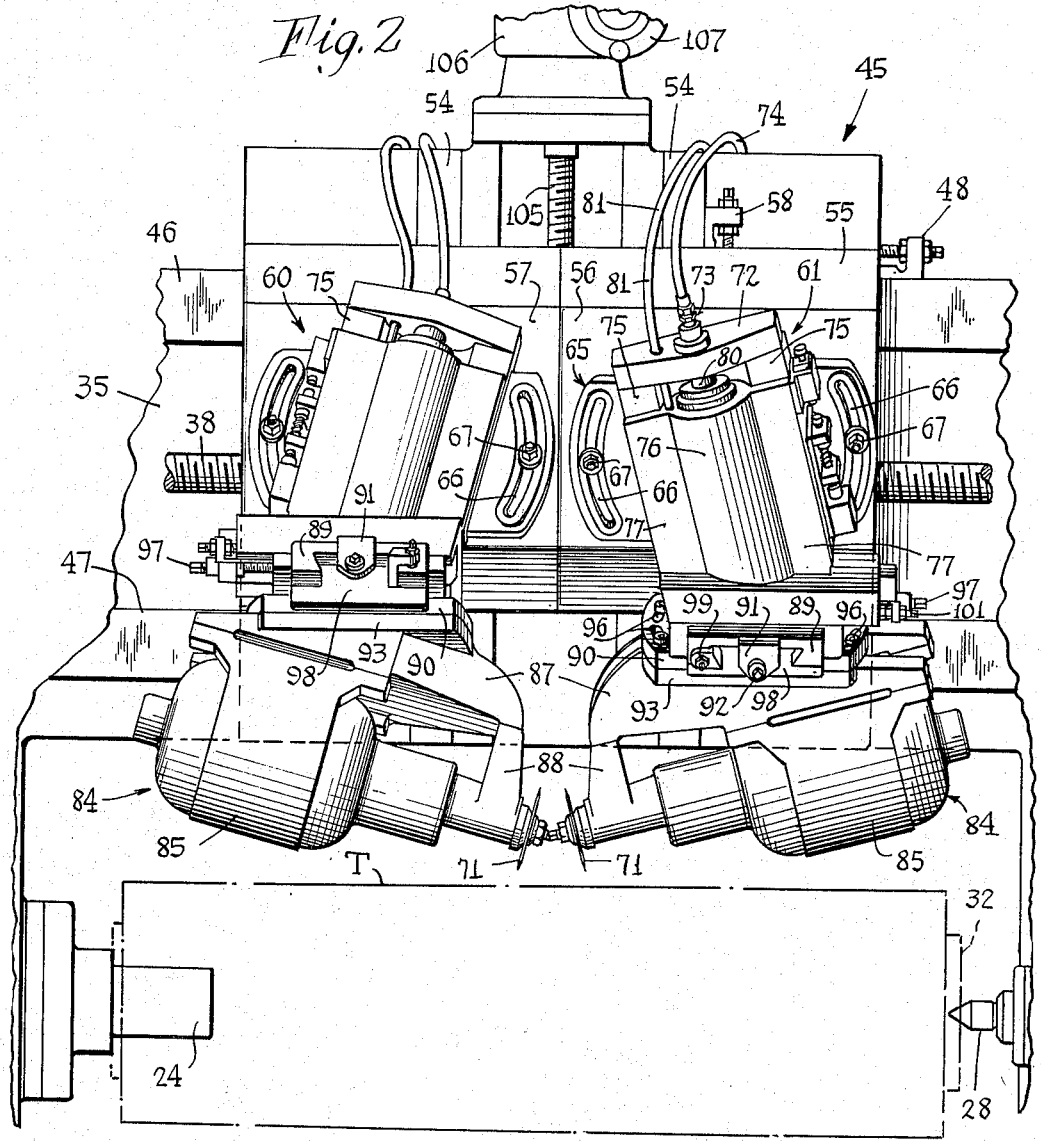
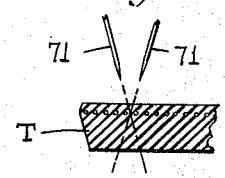
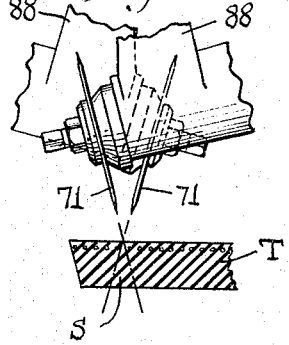
Fig. 2
Fig. 3
Fig. 3A
Fig. 3B
Inventor
Edmund J. Lomazzo
By Johnson and Kline
Attorneys Nov. 24, 1953 E. J. LOMAZZO 2,660,243
V BELT CUTTING MACHINE
Filed May 16, 1951 5 Sheets-Sheet 3

Inventor
Edmund J. Lomazzo
By
Johnson and Kline
Attorneys

Nov. 24, 1953  E. J. LOMAZZO  2,660,243
V BELT CUTTING MACHINE
Filed May 16, 1951 5 Sheets-Sheet 4

Inventor
Edmund J. Lomazzo
By
Johnson and Kline
Attorneys

Nov. 24, 1953 E. J. LOMAZZO 2,660,243
V BELT CUTTING MACHINE
Filed May 16, 1951 5 Sheets-Sheet 5
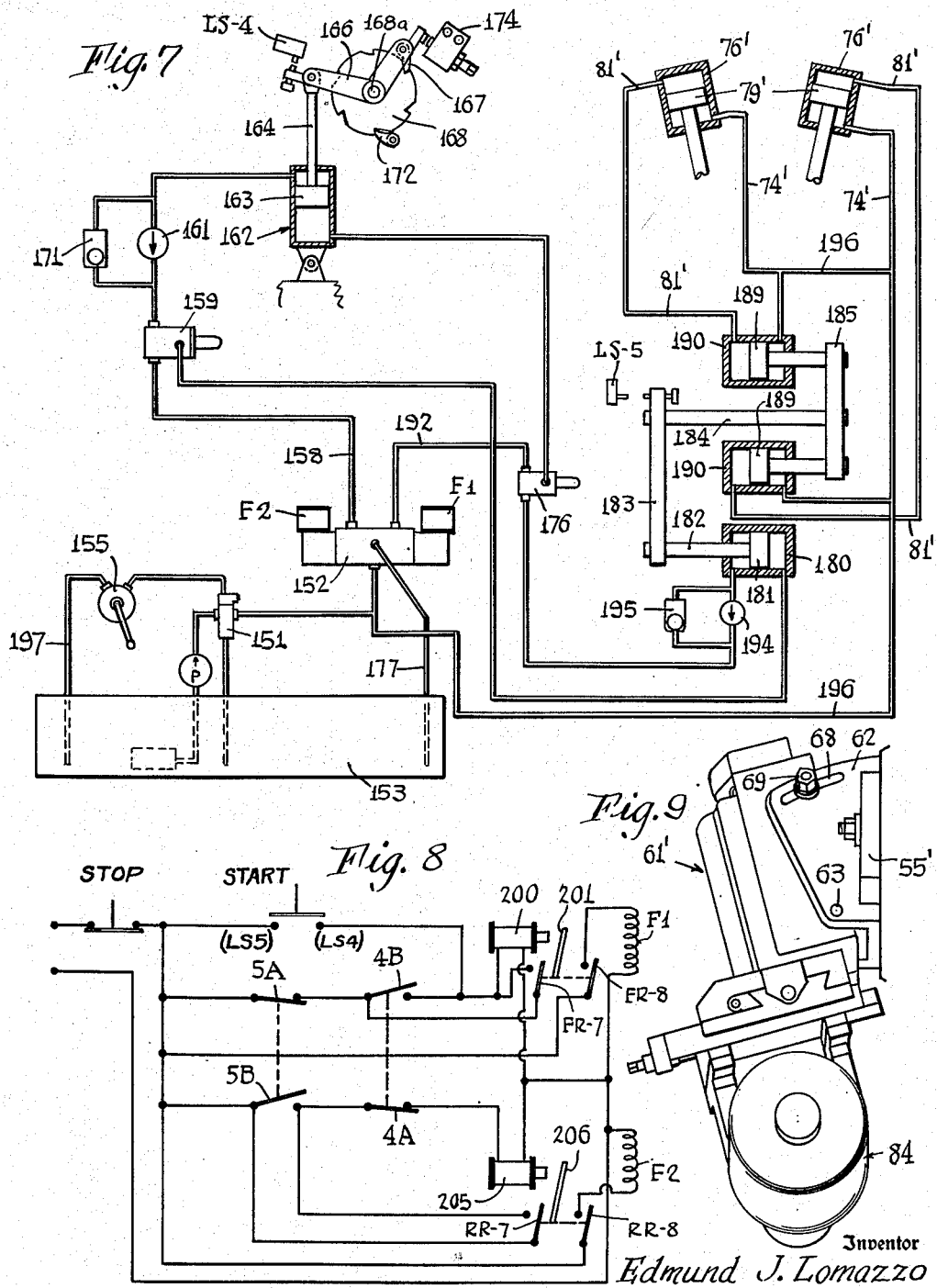
Inventor
Edmund J. Lomazzo
By
Johnson and Kline
Attorneys Patented Nov. 24, 1953

2,660,243

UNITED STATES PATENT OFFICE 2,660,243

V BELT CUTTING MACHINE

Edmund J. Lomazzo, Norwalk, Conn.

Application May 16, 1951, Serial No. 226,600

30 Claims. (Cl. 164—69)

The present invention is concerned with apparatus for cutting belts, rings or the like from a hollow cylindrical body such as a tube of rubber or similar material and is particularly concerned with apparatus for cutting V-belts which are adapted for use as drive belts or power transmission belts or the like.

In machines heretofore used, as in Patent No. 1,721,905, for the cutting of V-belts, the cutting means therein has normally comprised a rotatable cutter knife which is directly mounted on the end of a motor shaft and is adapted to be fed gradually, somewhat in the fashion of a lathe-tool, into a rotating hollow cylindrical body at spaced points along its length to slice it into a series of annular belts.

In order to provide for the cutting of various sizes and shapes of belts, the motor with the cutter knife mounted thereon has been heretofore pivotally mounted on a supporting bracket which has been slidably received in the machine frame, whereby the angular convergence of the side faces of the V-belt and the width of the top and bottom faces thereof may be adjustably predetermined and cut as desired. Inasmuch as the direction of movement of the cutting stroke of the knife was arcuate and not in a straight line, due to the pivotal mounting of the cutter, these adjustments had to be calculated and determined with this angular characteristic in mind, which made the adjustments more difficult to compute. This arcuate path of movement furthermore changed the cutting angle at which the cutter was operating during its cutting stroke and, as a result, difficulties were encountered inasmuch as the cutter was not always at a calculated cutting angle in relation to the rubber tube so as to provide the proper angle of heel or clearance for the cutter knife to prevent binding of the knife or slivering of the belts during the severing operation. Finally, the initial position and length of the stroke of the cutter knife had to be adjustable to compensate for the cutting of rubber tubes of different outside diameters and thicknesses.

All these adjustments had to be carefully made, keeping in mind the arcuate travel of the cutter knife, and, in the machines hitherto used, the adjustment of any one of them affected the others with the result that the adjustment of any one would then require the readjustment of the others. A very delicate balance had to be obtained only after considerable trial and error experimentation and such would often require a very long time and involve painstaking efforts.

It is an object of the present invention to provide a belt-cutting machine wherein the adjustments may be made simply and individually and without affecting previously made adjustments.

It is a further object of the present invention to provide a belt-cutting machine wherein the cutting means is fed into the rubber tube in a rectilinear path.

It is a still further object of the present invention to provide a belt-cutting machine wherein the cutting means may be moved in a rectilinear path at various speeds by valve controlled hydraulic power means.

Another object of the present invention is to provide synchronizing means for controlling and regulating the movements of dual cutting means in belt-cutting machines.

A feature of the present invention is the provision of a belt-cutting machine having an automatically operable hydraulic power means which will feed the cutter knife into the rubber tube to cut an annular belt therefrom; withdraw the cutter knife from the rubber tube; and then advance the cutter knife to a new position by a self-acting indexing operation; and then repeat the cycle of feeding, withdrawing and indexing operations automatically until the entire rubber tube has been sliced into the desired annular belts.

A further feature of the present invention is the provision of an interlocking means whereby the indexing operation cannot take place during the feeding or withdrawing of the cutter knife.

Other objects and features of the present invention will become apparent hereinafter.

In the accompanying drawings:

Fig. 2 is a fragmentary view in elevation drawn to a larger scale than Fig. 1 to show in greater detail the construction of the cutter supporting mechanism.

Fig. 3 is an enlarged fragmentary view in elevation showing the manner of cutting a V-belt from the end of the rubber tube, which tube has been shown in cross-section to reveal the nature of the cut made.

Fig. 3A is an enlarged fragmentary view in elevation showing a different position of the cutters.

Fig. 3B is an enlarged fragmentary view in elevation showing still another position of the cutters.

Fig. 7 is a schematic showing of a modification of the hydraulic mechanism shown in Fig. 5.

Fig. 8 is a wiring diagram showing the electrical relationship of the various elements required for the operation of the hydraulic mechanism shown in Fig. 7.

Fig. 9 is a side elevational view showing a modified adjustable mounting for the cutter supporting mechanism.

Figure 1:
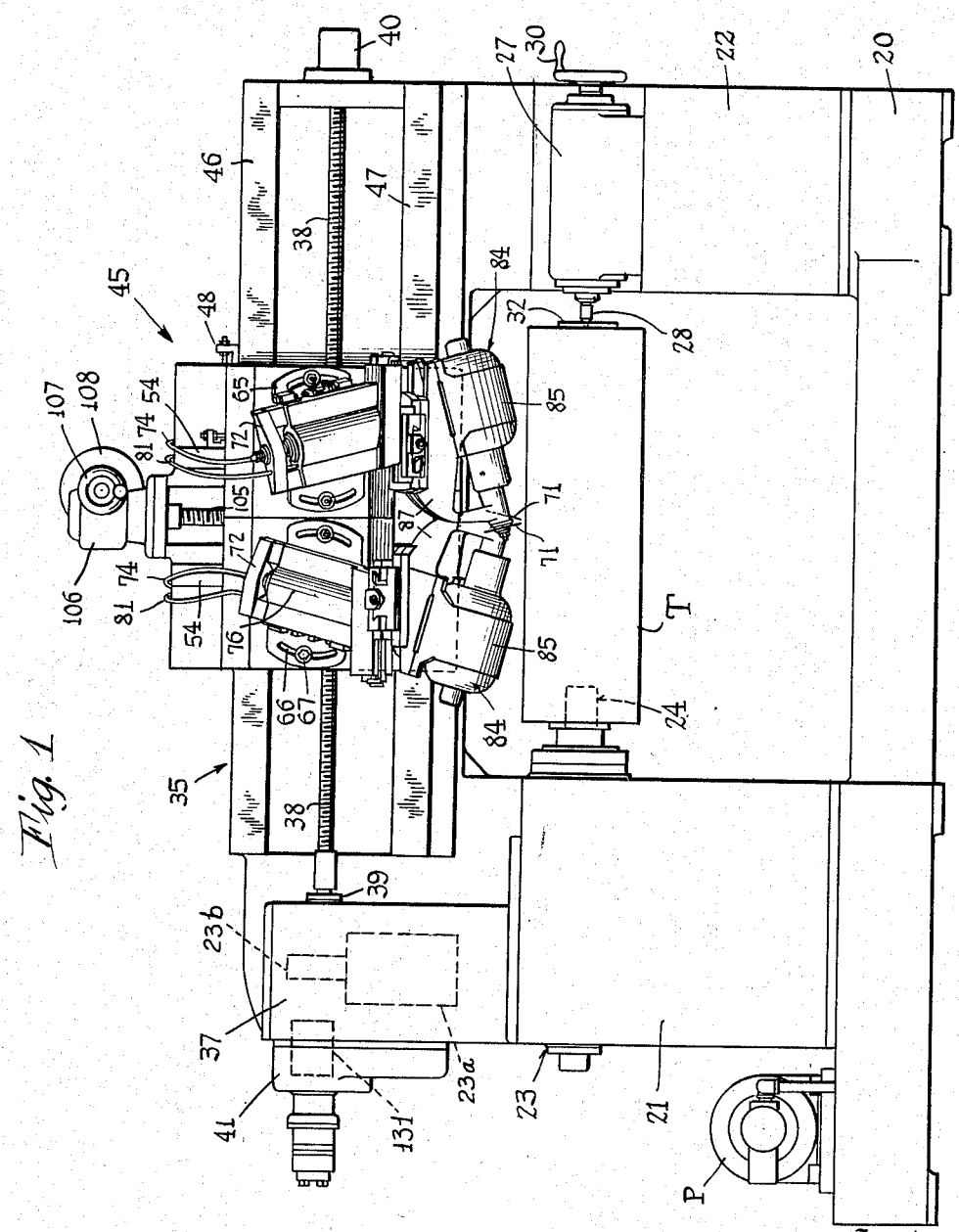
Figure 1 is a view in elevation of the complete belt-cutting machine.

In the preferred embodiment of the invention, the belt-cutting machine shown in Fig. 1 comprises a base 20 at the ends of which are mounted vertically upstanding rectangular supporting housings 21, 22. A suitable driving motor 23 may be located within the supporting housing 21 to drive a main spindle or shaft 24 which protrudes from the end of the supporting housing 21 in the direction of the other supporting housing 22. Suitable gearing may, of course, be interposed between the motor 23 and the shaft 24 whereby any desired speed of shaft 24 may be obtained.

The supporting housing 22 is suitably recessed to receive an adjustable tail-stock member 27 from which protrudes a spindle 28 having a live center with a cone shaped end. The axis of the spindle 28 is aligned with the axis of shaft 24, whereby objects positioned between the end of the shaft 24 and the cone shaped end of the spindle 28 will be capable of rotation on that axis. An operating handwheel 30 is provided whereby the spindle 28 may be advanced or withdrawn in relation to the shaft 24 to secure objects between the opposed ends in very much the same fashion as the tail-stock center on a lathe. Suitable locking means (not shown) may be employed to lock the spindle 28 in adjusted position.

The rubber tube T which is intended to be sliced into belts is mounted upon a cylindrical mandrel 32 which is adapted to fit between the protruding end of shaft 24 and the cone shaped end of adjustable spindle 28 and to be rotated thereby by being secured to the drive shaft 24 by means of a lathe dog or other means. The mandrel 32 is of the usual expansible and collapsible type, well known in the art, and should need no further description. Consideration of Figs. 1 and 2 will reveal how the rubber tube T will be rotated in relation to the other elements of the belt-cutting machine.

The supporting housings 21, 22 extend upwardly above the axis of rotation of the tube T and the upper portions thereof are joined by a rigid, horizontal cross-member 35. A gear housing 37 may be provided on the upper portion of supporting housing 21 and suitable speed reduction gearing 23a and clutch means 23b may be provided therein to be connected to and drive a threaded feed screw 38 at desired speeds by means of the motor 23 when desired. The threaded feed screw 38 is supported in bearings 39, 40 located in the supporting housings and thus the feed screw 38 extends along the major portion of the length of the belt-cutting machine. As shown in Fig. 1, the feed screw 38 extends substantially parallel to the axis of rotation of the rubber tube T, as defined by the axis of shaft 24 and the spindle 28.

A cutter supporting carrier or carriage 45 is slidably mounted upon slideways 46, 47 of the fixed cross-member 35 and is connected to cooperate with the feed screw 38 so that the rotation of the feed screw 38 will move the cutter supporting carrier 45 along the work as required. A gib or wear member 48 may be adjustably secured to the cutter supporting carrier 45 to compensate or take up for any wear resulting from the sliding of the carrier 45 on the ways of the cross-member 35.

A suitable indexing device 41, as is well known and commonly used in the art, is also provided for in the housing 37 to actuate screw 38 in the following cycle: first, the feed screw 38 is actuated by the reduction gearing to advance the cutter supporting carrier 45 to a predetermined starting position and thereafter it is disconnected and operated step-by-step by the indexing device 131 to intermittently advance the carrier after each cutting operation, which cutting operations will be described more fully hereinafter; and upon the conclusion of these cutting operations, the carrier 45 will be returned through the usual quick-return drive to the initial starting position. The machine is then reloaded by having another rubber tube replace the rubber tube T (now cut into belts) and the cutting operations repeated.

Figure 4:
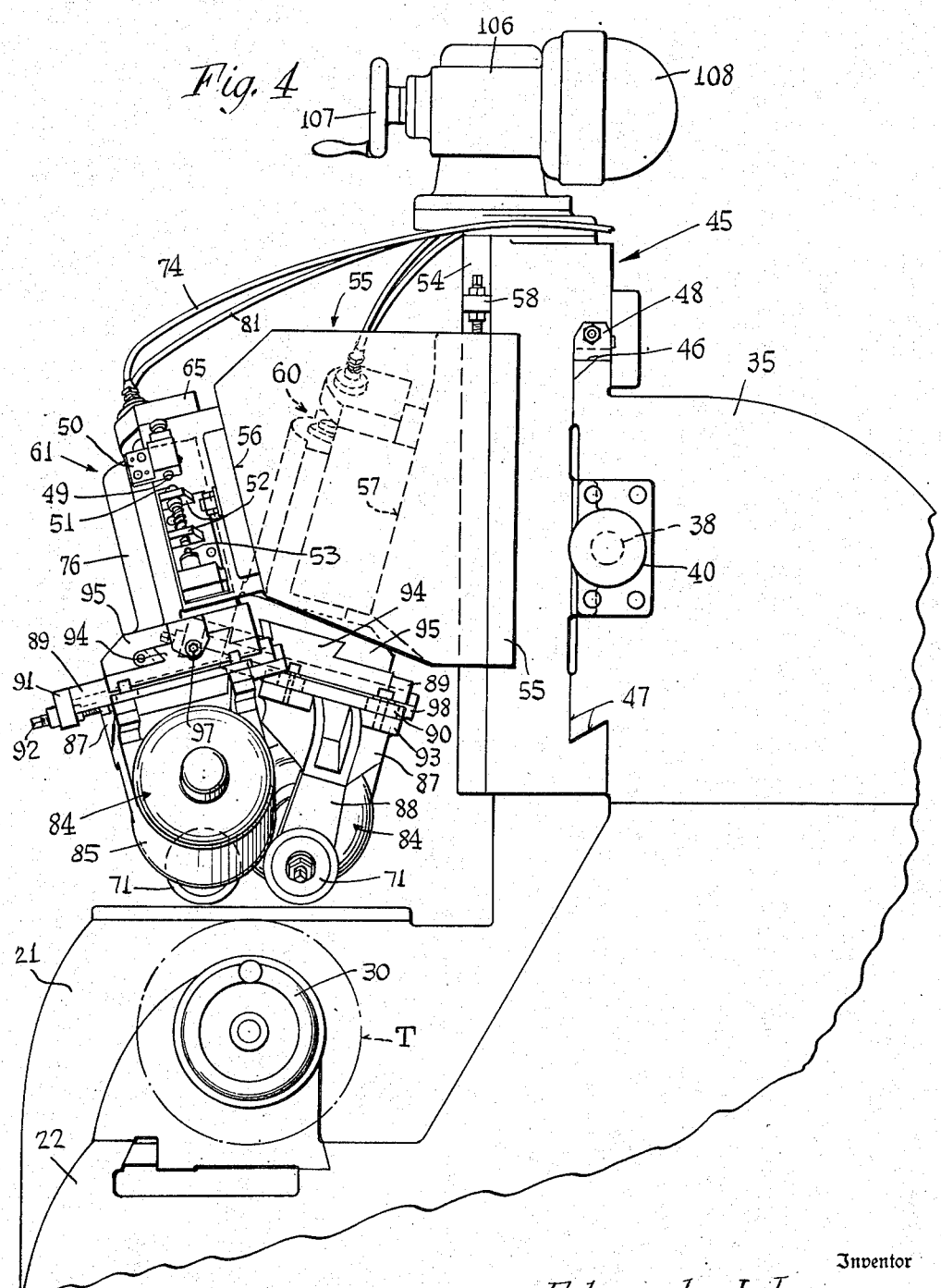
Fig. 4 is a fragmentary view in end elevation to show the cutter relationship to the rubber tube.

As shown in Fig. 4, the cutter supporting carrier 45 comprises a mounting bracket 55 which is slidably received in vertical slides or guideways 54 on the front of the carrier member 45. A suitable gib or wear member 58 may be adjustably secured to the bracket 55 to compensate or take up for the wear resulting from the sliding of the bracket 55 on the vertical guideways 54. The mounting bracket 55 has two machined surfaces 56, 57 which have been shown as being inclined at approximately 15° to each side of the vertical and thus form an angle of 30° to each other.

The purpose of such an angle will become clear hereinafter and it is merely necessary at this point to mention that the use of an angle of 30° is purely illustrative and is not to be construed as limitative of the invention, inasmuch as other angles could be used, depending on the size and shape of the cutter carriers or of the objects to be cut. Pivotally mounted upon the ground surfaces 56, 57 are plunger-operated mechanisms 60, 61. Inasmuch as these plunger-operated mechanisms are similar, merely the right-hand plunger mechanism 61, as viewed in Figs. 1 and 2, will be described but it is to be appreciated that corresponding parts exist in the left-hand mechanism 60, although of opposite hand and oppositely directed.

As shown in Fig. 2, a supporting plate-like bracket and guide member 65 is pivotally mounted on the inclined machined surface 56 and its relative angular position thereon may be adjusted by means of arcuate slots 66 therein and bolts 67 which are adapted to penetrate the slots 66 and enter tapped holes in the inclined surface 56. It will be appreciated that the supporting bracket and guide member 65 may be pivotally rotated to any desired angle and then locked in that position by tightening the bolts 67. The center of rotation of such pivotal movement is, of course, located at the center of curvature of the arcuate slots and the plane of rotation is parallel to surface 56. Thus, the plane is at an angle of 15° to the plane of Fig. 2 and perpendicular to the plane of Fig. 4.

Returning now to Fig. 2, the supporting bracket and guide member 65 comprises a top cross bar or member 72 fixedly secured to the supporting bracket 65 and in which is formed an opening for the mounting of a hollow rod 80 and suitable coupling means 73 to which may be attached a hydraulic hose of flexible tubing 74. The hose member 74 thus communicates through the hollow rod 80 with the interior of a hydraulic cylinder 76 which cylinder is guided by fins or wings 77, 77 sliding in ways or side members 75, 75 at right angles to and secured to the top cross-member 72 and also fixed to bracket 65. The hydraulic conduit 74 communicates with the interior of the cylinder 76, see Fig. 5, so that oil or other liquid may be pumped thereinto below a stationary piston 79 therein secured to the end of fixed hollow rod 80 to lower the cylinder 76 along the slideways or side members 75, 75. Another hydraulic hose or conduit 81 penetrates through the wall of the cylinder 76 and enters the interior thereof above the stationary piston 79. It will be apparent from Fig. 5 that any oil or other liquid introduced by the conduit 81 into the space above the piston will urge the cylinder 76 upwardly along the slideways or side members 75, 75.

As shown in Fig. 2, a motor 84 is suspended from the lowermost portion of the cutter carrying supporting member 45 by means of the motor housing 85 and has mounted on the end of its motor shaft a circular cutting knife 71. Such an arrangement provides that the plane of the cutting knife 71 extends at all times at right angles to the axis of the motor shaft. The motor supporting housing 85 is secured to a connecting bracket 87 which braces the cutter 71 in relation to the motor 84 and the housing 85. One portion of the bracket 87 extends over the protruding motor shaft and is formed thereat to support a brace 88 for the cutter knife 71. Another portion of the bracket 87 extends upwardly and comprises a flat plate surface 93 (Fig. 2) which is adjustably and rotatably mounted on the underside of a slide plate 90 to rotate on an axis perpendicular to said plate 90. The purpose for such a rotatable adjustment, and the presence of locking knobs 96 to secure the plate 93 in adjusted position, is to provide for a desired angle of heel or clearance of the cutting knife 71 as it enters the tube T so as to prevent binding of the tool or slivering of the tube T during the cutting operation. This angle is very small and is of the order of only a few degrees or less and depends upon the relative rates of the speed and feed of the cutting knife and the speed of the tube T, the nature and thickness of the material of tube T, etc.

The flat slide plate 90 has formed on its upper surface a projecting dove-tail slide 98 having inwardly inclined walls which are slidably received within an inclined dove-tail groove on the undersurface of a slideway plate 89. An adjusting screw 92 is passed through a downwardly extending projection 91 of the grooved plate 89 and is threaded to the slide plate 90 and is the means whereby the slide plate 90 may be adjusted forwardly or rearwardly in the slide and groove 98, 89. A wear plate and gib screw 99 may be provided to hold the slide plate 89 in properly adjusted position and to compensate for wear resulting in the sliding of the dove-tail slide 98 in the dove-tail groove plate 89.

The groove plate 89 and the slide plate 90 slidably contact each other in a plane perpendicular to the plane containing the axis and side wings 77 of the plunger cylinder 76 (see Fig. 4), so that the adjustments of the motor 84 and cutter 71 secured thereto are perpendicular to the direction of operating movement of the cylinder 76.

As best shown in Fig. 4, the grooved plate 89, in turn, has a dove-tail slide plate 94 formed on its upper surface and this slide plate 94 is adapted to slide within a dove-tail grooved track plate 95 which is secured to the bottom of the plunger cylinder 76. The slide 94 and the groove 95 in this arrangement are organized to provide for movement of the grooved plate 89 and all structure supported thereby including the motor 84 and the cutter 71 parallel to the axis of the rotatable rubber tube T. An adjustable set screw 97, see Fig. 2, extends through a downwardly extending projection of the lower portion of the plunger cylinder 76 and is threaded into the dove-tail slide plate 94 and is the means whereby the position thereof may be adjusted. A wear plate and gib screw 101 is provided to hold the slide plate 94 in properly adjusted position and to compensate for wear arising from the sliding movements of the slide and groove.

From the above, it will be apparent that the cutter knife 71 may be adjusted so as to be moved laterally with respect to the axis of the mandrel, as seen in Fig. 4, that is, laterally at right angles to the direction of movement of the cylinder 76 by the slide and grooved plates 98, 89, whereby the cutter wheel may be accurately positioned so that it will be guided into the rubber tube T at the desired circumferential point on its periphery in the direction of the center of rotation of the tube T. Similarly, the cutter knife 71 may be adjusted so as to be moved axially with respect to the axis of the mandrel, as seen in Fig. 2, that is, axially along the rubber tube T so that it may be positioned to be accurately guided into the rubber tube T at the desired lengthwise point on its periphery to provide for means for cutting various widths of belts.

As shown in Figs 2 and 4, the inclined mounting bracket 55 may be raised or lowered as a complete unit by means of the vertical slideways 54 on the front of the cutter supporting carrier 45 in order to accommodate tubes of different diameters. A feed screw 105 engages an internally threaded bore in the cutter supporting carrier 45 and is guided up into a threaded bore in the vertical adjusting head 106. A manually controlled handwheel 107 may be used to raise or lower the mounting bracket 55 with respect to the cutter carrier 45, or a motor 108 may be employed to control this movement, whereby the initial position of the cutter carrier or cylinder 76 may be varied.

Let us assume that it is desired to cut a V-belt having a specified outside diameter of 20 inches; a thickness of $\frac{7}{16}$ inch; a top width of 1 inch; and an included angle of 34°. The method of cutting such a V-belt on the disclosed machine would be as follows:

A stock rubber tube having an outside diameter of 20 inches and a thickness of $\frac{7}{16}$ inch is selected and placed on a mandrel which is then mounted in the machine between the ends of shaft 24 and the spindle 28. As best shown in Fig. 2, with the plunger in its uppermost position, the bolts 67 which pass through the arcuate slots 66 are loosened and the supporting brackets 65 are each adjusted to an angle of 17° to the vertical so as to lie at an angle of 34° to each other. The bolts 67 are then tightened and the bracket held in the adjusted position. It is to be noted that such adjustment now will provide for the plunger cylinders 76 to move downwardly into the rubber tube at the proper angle of 34°, as desired.

The cutter knife 71 should enter the rubber tube T at such an initial point that, when it is moved by the plunger cylinder 76, it will be aimed at substantially the center of rotation of the mandrel supporting the tube T. The adjustment whereby this is obtained is best seen in Fig. 4. The handwheel 107 may be used to lower the cutter supporting carrier 55 and the cutter 71 mounted thereon. As the cutter approaches the surface of the tube T, it is guided in or out accordingly by moving the adjusting screw 92 until the cutter comes to rest just grazing the surface of the tube T and at the proper angle so that the further movement of the cutter carrier plunger cylinder 76 will move the cutter 71 in a radial direction into the tube. In the particular machine illustrated, with the machined faces being at an angle of 15° to the vertical, the line joining the center of the cutter 71 and the center of rotation of the tube T should similarly be 15° to the vertical. This angle need not be precisely exact and it is merely necessary that the cutter 71 move substantially radially. This is due to the fact that the cutting is performed well away from the center of rotation of the tube T and no appreciable error will be introduced if the cutter does not move perfectly radially.

It is to be noted that this adjustment of the initial circumferential contacting point of the cutter knife 71 on the periphery of the tube T does not affect the direction of movement of the cutter 71 which will still move into the tube at an angle of 17° to the vertical, as seen in Figs. 1 and 2, whereby the original 34° setting is not affected.

Having positioned the plunger cylinder 76 at the proper angle for the cutting stroke and having determined the initial circumferential contacting point on the surface of tube T for the cutter 71, the next adjustment consists in setting the cutting wheels 71 for the proper width of the top face of the V-belt by moving the contacting point axially of the tube T. This may be done in many ways such as, for example, by using the chalk-trace method. In this method, the surface of the tube T is slightly dusted or powdered with chalk particles and the tube T is slowly rotated by manual means. The cutters 71 which are in grazing contact with the surface of the tube T will trace thereon a thin circumferential line, or if the cutters are spaced apart, a pair of such lines. As shown in Fig. 3, the cutters 71 will trace a single line which will result in a fine edge at the sides of the V-belt.

The belt-cutting device is then indexed to its new position and again the thin circumferential line is traced by stopping the cutting knives 71 just as they graze the tube T and are about to cut a belt therefrom. A thin circumferential line is thus traced at the indexed position which is then compared to the first traced line. The distance is then measured and the indexing device is adjusted accordingly by means of conventional change gears to get the proper width.

Should it be desired to form a slight bevel or chamfer on the V-belt, the cutter knives may be separated slightly so that they trace a pair of thin circumferential lines as shown in Fig. 3A. This type of belt is preferable as it does not have a "feather edge" at the ends of the top face. However, the indexing device must be adjusted accordingly to compensate for the slight difference in scrap thickness cut from between the V-belts. This type of belt cutting is commonly called "scrap cutting" inasmuch as the cutters actually cut down on each side of an annular piece S of scrap during the cutting stroke, as shown in Fig. 3. If desired, the machine of the present invention could be used to be a "belt-cutting" machine wherein the cutters cut down on each side of the belt during the cutting stroke. This may be done by simply adjusting the cutters so that they are separated by the thickness of the top face of the V-belt as shown in Fig. 3B.

If it is desired to operate the machine completely automatically during the last adjustment of the width of the belt, the chalk-trace method need not be employed but measurements may be taken on the actual cuts made by the machine, and adjustments made on the indexing device accordingly. This method may be quicker but is wasteful of the material cut up during the adjusting period.

Figure 5:
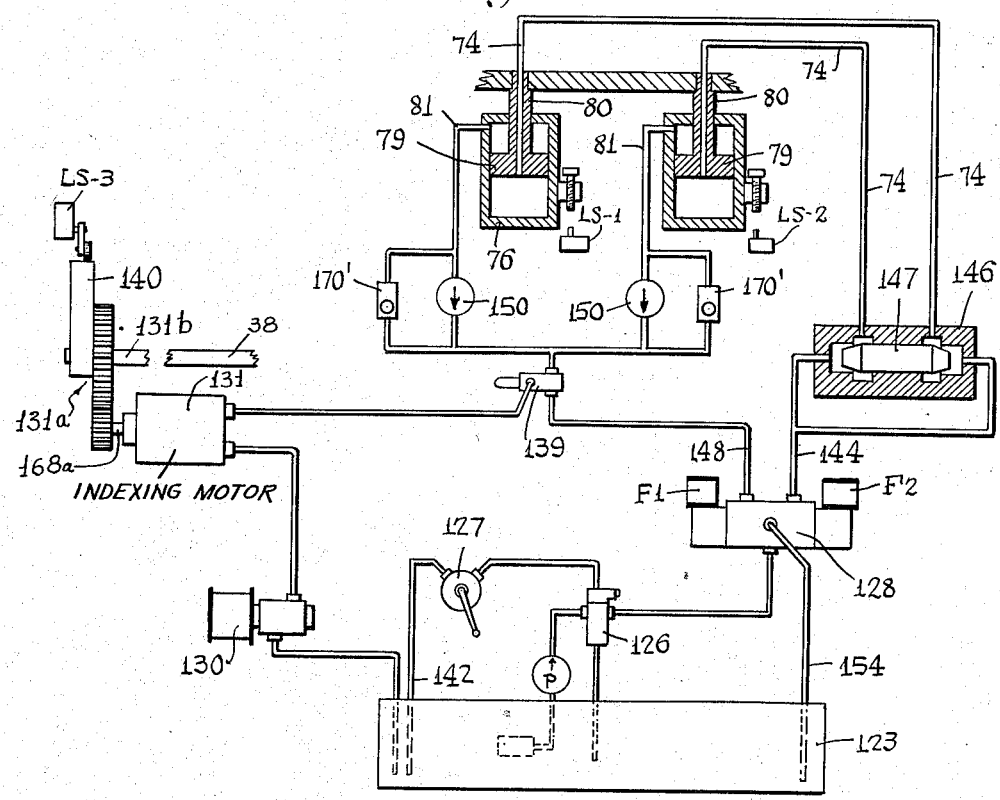
Fig. 5 is a schematic drawing showing the hydraulic mechanism for operating the cutter and associated mechanism.
Figure 6:
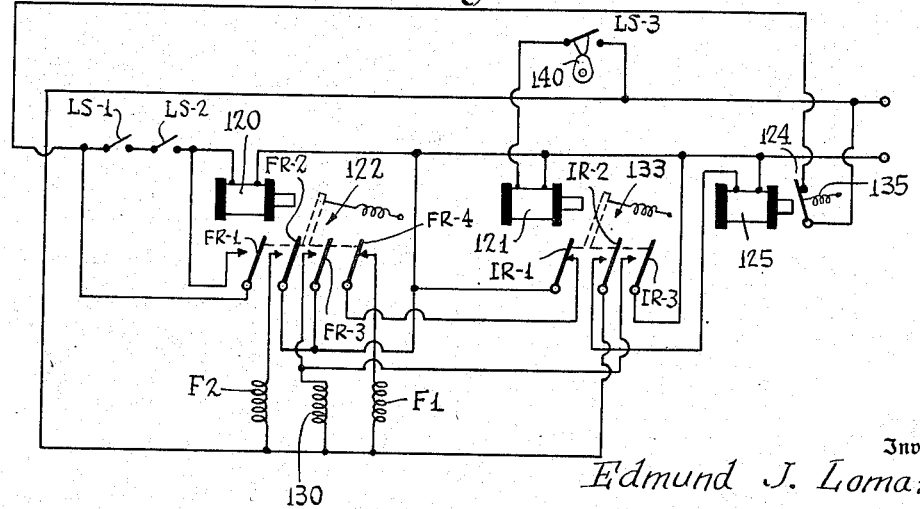
Fig. 6 is a wiring diagram showing the electrical relationship of the various elements required for the operation of the hydraulic mechanism shown in Fig. 5.

Consideration of Figs. 5 and 6 will make clear the operation and functioning of the hydraulic power means and the electrical circuits associated therewith, whereby the cylinders 76 and the cutters 71 thereon are automatically (1) fed into the rubber tube T to cut a belt therefrom; (2) returned upwardly to its top position; and (3) moved forwardly by an indexing operation to complete a cycle which is then repeated along the length of tube T to cut a series of rubber belts from the tube T.

*Feeding. Feed relay open. Index relay open*

The electrical wiring diagram shown in Fig. 6 sets forth the relationship of the electrical devices and their circuits as they exist during the feeding or inward work stroke of the cutter 71, as the cylinders 76 move toward limit switches LS-1 and LS-2. As shown, a feed relay 120 and an index relay 121 are open. Consideration of a switch 122 associated with the feed relay 120 will reveal that it is normally open and that:

(1) Feed relay contact FR-1 is open. This is the feed relay holding circuit contact which, if closed, would hold the feed relay 120 in energized, closed position, even though limit switches LS-1 and LS-2 located at the lowermost positions of cylinders 76 would be open.

(2) Feed relay contact FR-2 is open. This contact, if closed, would energize a return solenoid F2 which is located in a compound four-way valve 123, as shown in Fig. 5, to initiate the return stroke of cutter 71.

(3) Feed relay contact FR-3 is open. This contact, if closed, would energize an indexing solenoid 130 which would permit the indexing of the cutter 71 on the cylinder 76 by means of an indexing motor 131 in the indexing device 41.

(4) Feed relay contact FR-4 is closed. This contact, when closed, as it is at this time, energizes feed solenoid F1 which brings about the feeding of the cutter 71 on cylinder 76.

With reference to a switch 133 associated with the index relay 121, it is to be noted that it is also normally open and that during the feeding stroke of the cutter 71:

(1) Index relay contact IR-1 is closed. This contact, when closed, as it is now, completes the circuit including the feed relay contact FR-4 and feed solenoid F1 which brings about the feeding or working stroke of the cutter 71 on cylinder 76.

(2) Index relay contact IR-2 is open. This contact, if closed, would energize a time delay relay 125 to open a switch 124 against the action of a holding spring 135 to open the circuit containing the feed relay 120.

(3) Index relay contact IR-3 is open. This is the index relay holding circuit contact which, if closed, would hold the indexing solenoid 130 in energized condition even after feed relay contact FR-3 is opened.

It is to be noted that, during the feeding stroke, the time delay switch 124 is normally closed due to the spring action exerted thereon by a spring 135. Limit switches LS-1 and LS-2 located at the lowermost position relative to the movement of the cylinder 76 are open. Limit switch LS-3 which is in the indexing circuit, is open.

During this time, it is to be observed that the only circuit which is closed is the circuit containing the feed solenoid F1 which brings about the feeding downwardly of the cylinder 76 to perform a cutting, or work stroke.

*Return. Feed relay closed. Index relay open*

The cylinder 76 is fed downwardly until limit switches LS-1 and LS-2 are contacted and closed. This is the lowermost position of the cylinder 76 and is arrived at by the closing of limit switches LS-1 and LS-2. The circuit through the feed relay 120 is completed and is closed through the normally closed time delay switch 124. When the feed relay is energized, it closes the switch 122 associated therewith. As a result:

(1) Feed relay contact FR-1 closes. This is in the feed relay holding circuit which extends in parallel relationship to the circuit containing the limit switches LS-1 and LS-2 so that, even if these limit switches were to be opened at a later time by the cylinders 76 moving upwardly, the contact FR-1 will remain closed to keep the feed relay 120 energized to keep the relay switch 122 associated therewith also closed.

(2) Feed relay contact FR-2 closes. This closes the circuit containing the return solenoid F2 located in the 4-way feed valve 128, and initiates the return stroke of the cylinder 76.

(3) Feed relay contact FR-3 is closed. This closes the circuit containing the indexing solenoid 130 and prepares the way for the indexing movement of the cylinder 76. No indexing takes place at this time, inasmuch as there is no driving force being exerted on the indexing motor 131.

(4) Feed relay contact FR-4 opens. This opens the circuit containing the feed solenoid F1 which has been directing the feed stroke of the cylinder 76. Inasmuch as the feed solenoid F1 is now deenergized and its circuit is open and interrupted, and, inasmuch as the return solenoid F2 is energized and its circuit is closed (note feed relay contact FR-2) the feeding of the cylinder 76 and the cutter 71 stops and return thereof commences in an upward direction.

Just prior to this movement, the feed relay 120 is closed and the index relay 121 is opened. As soon as the cylinders 76 begin to move upwardly, limit switches LS-1 and LS-2 are both reopened. However, inasmuch as feed relay contact FR-1 is closed, the circuit containing the feed relay 120 remains closed, to hold the switch 122 associated therewith also closed. It is to be noted that the normally-closed time delay switch 124 is still closed at this time to complete the circuit containing the feed relay 120. This condition of the circuits continues until the cylinders 76 reach the uppermost position of the return stroke.

When the cylinders 76 reach the uppermost positions of their return strokes, with the cutters 71 clear of the work, a sequence valve 139 opens (see Fig. 5), due to the increase of fluid pressure therein, and permits the flow of the motivating fluid to be diverted from the cylinders 76 to operate an indexing motor 131 which causes by screw 38 the indexing movement of the cylinder 76 along the belt-cutting machine, as desired. The operation of the indexing motor 131 is possible, inasmuch as the indexing solenoid 130 was previously prepared by the closing of feed relay contact FR-3 in the feed relay switch 122. The movement of the indexing motor 131 causes a rotation of a control cam 140 which is connected to the gearing 131a, driving shaft 131b which actuates the screw 38. The control cam, upon sufficient rotation, will cause the limit switch LS-3 in the indexing circuit to close.

*Indexing. Feed relay open. Index relay closed*

When the limit switch LS-3 closes, this completes the circuit including the index relay 121 which is energized to close the switch 133 associated therewith. When this occurs, the following takes place:

(1) Index relay contact IR-1 is opened. This contact is in the circuit in series with the feed relay contact FR-4, containing the feed solenoid F1. When this index relay contact IR-1 is open, closing of the feed relay contact FR-4, accidentally or otherwise, cannot energize the feed solenoid F1 inasmuch as the opening of the index relay contact IR-1 creates an open circuit condition. By this means, it is impossible to have the feeding stroke go on at the same time that the indexing is in operation.

(2) Index relay contact IR-2 is closed. This is the contact which energizes the time delay relay 125 to open the time delay switch 124. Opening of the time delay switch 124 breaks the feed relay circuit completely and the switch 122 associated therewith moves to the open position. As long as the time delay switch 124 is open, closing of the feed relay 120 and its contact FR-2, accidentally or otherwise, cannot energize the feed relay 120 to complete the return solenoid circuit through feed relay contact FR-2 and the return solenoid F2 cannot be energized. Thus, this movement of the switch 122 opens the circuit containing the return solenoid F2 which prevents the return stroke from going on at the same time that the indexing is in operation.

(3) Index relay contact IR-3 closes. This contact is in parallel with the holding circuit for the indexing solenoid 130, so that even with the feed relay switch 122 open, the indexing solenoid 130 will remain energized so that indexing may still continue. It is to be noted that in this condition of indexing, the feed relay circuit is open and the index relay circuit is closed.

*End of indexing. Index relay opens*

Indexing continues until the control cam 140 makes sufficient rotation to open the limit switch LS-3. When that switch is opened, the index relay 121 is deenergized and the switch 133 associated therewith will open. This will cause the index relay to open and the index relay contacts to assume the following positions:

(1) Index relay contact IR-1 closes, which closes the feeding circuit through feed relay contact FR-4 which circuit includes the feed solenoid F1. Reference to the feed relay contacts reveals that feed relay contact FR-4 is now closed which will bring about an energized condition of the feed solenoid F1 to cause a feeding of the cylinder 76 and cutter 71 into the rubber tube T.

(2) Index relay contact IR-2 opens. This breaks the circuit through the time delay relay 125 and closes the time delay switch 124 which completes the circuit including the feed relay 120 and the feed solenoid F1 whereby a feeding stroke will be possible.

(3) Index feed contact IR-3 opens. This is the contact which opens the holding circuit for the indexing solenoid 130 which is deenergized, and which effectively stops the indexing.

The feeding of the cylinders and cutters then begins again and we are now back at the beginning of the cycle again. This cycle of feeding, returning and indexing then continues automatically until the entire rubber tube T is cut up into annular belts, as desired.

Consideration of Fig. 5 will show in greater detail the operation of the elements of the hydraulic power means whereby the cutter 71 is automatically fed into its lowermost position into the rubber tube T to cut a belt; then returned upwardly to its topmost position clear of the tube T; and then moved forwardly automatically by an indexing operation to the next cutting position. The hydraulic means shown in Fig. 5 sets forth the cooperative relationship of the operating parts to the actuating electrical circuits shown in Fig. 6.

As shown in Fig. 5, which represents the feed stroke of the cylinder 76, a pump P is urging liquid, such as oil, from a tank 123 up into a relief valve 126. A vent or cycle control valve 127 is in such a position at this time that the liquid is urged into the right-hand branch leading out of the relief valve 126. If it is desired to temporarily shut down the hydraulic means shown in Fig. 5 without stopping the operation of pump P, all that is necessary is to actuate the vent or cycle control valve 127 so as to vent the relief valve 126 which will cause the fluid from pump P to be returned to the tank.

Assuming that the vent or cycle control valve 127 is closed, the pump P will force the liquid through the relief valve 126 and up into a 4-way valve 128 at which point it will be directed through a right-hand conduit branch 144 leading upwardly therefrom. The reason that the fluid is directed through this right-hand exit is that the feed solenoid F1 is energized during the feeding stroke which opens a port in the 4-way valve to permit the fluid to pass upwardly through the right-hand exit 144. At the same time, a port is opened in the 4-way valve 128 to permit any fluid being returned from the hydraulic system by conduit 148 to pass through the 4-way valve and be returned through tank line 154 to the tank 123. It is to be noted that the fluid being returned from above the pistons 79 will pass through metering or control devices 150, 150 in a direction indicated by the arrows thereon, whereby the flow of the liquid and the speed of the cylinders is controlled very accurately.

The fluid which passes upwardly from the 4-way valve 128 branches in two directions and enters both sides of a pressure balance valve 146. As is seen schematically in Fig. 5, a floating valve 147 is contained within the pressure balance valve, whereby the rate of flow of fluid will be equalized in both feed branches 74 leading upwardly from the pressure balance valve 146. The fluid is then directed into the interior of the cylinders 76 and enters therein below the fixed piston 79. This will cause both cylinders 76 to be urged downwardly during the feeding stroke to have their cutters sever a rubber belt from the tube T.

When the cylinders 76 reach their lowermost positions, limit switches LS-1 and LS-2 will be closed. As discussed previously in connection with the electrical diagram illustrated in Fig. 6, the closing of limit switches LS-1 and LS-2 will cause the feed solenoid F1 to become deenergized and the return solenoid F2 to become energized, which changes take place in the 4-way valve 128.

As a result, the pump P will now draw the fluid up from the tank and force it through the relief valve 126 into the 4-way feed valve 128, but now it will exit therefrom into the left-hand branch 148. At the same time, a port is opened in the 4-way valve to permit any fluid returning from the hydraulic system through the right-hand branch 144 to pass through the 4-way valve and be returned to the tank 123 through tank line 154.

The fluid passing upwardly through the left-hand branch 148 goes through a sequence valve 139 and branches off thereabove to be guided through the check valve or bypass 170' around the metering valves 150, 150 of the speed control device. After passing through the bypass around the speed control device 150, 150, the liquid is led upwardly through tubing 81 and into the interior of the cylinders 76 above the fixed pistons 79. This will start the return stroke of cylinders 76.

As the cylinders 76 are urged upwardly, the fluid formerly under the piston 79 will now exhaust up and over back through the pressure balance valve 146 into the 4-way valve device 128 and then be led into the tank through tank line 154. At the same time, the actuating fluid will continue to be guided through conduit 81 into the interior of cylinder 76 above the fixed piston 79 to continue the movement of the cylinder 76 upwardly. When the cylinder 76 has reached its uppermost position, and can go no farther, the fluid will build up pressure with the result that the fluid coming from the 4-way valve 128 and entering the sequence valve 139 will be diverted over to the indexing motor 131. It will be appreciated that no fluid can be diverted over to the indexing motor 131 until after the completion of the return stroke and the concomitant backing up of the fluid pressure, thereby preventing the initiation of the indexing until the conclusion of the return stroke.

The fluid which is thus diverted will run the indexing motor 131 which, as mentioned previously, rotates the control cam 140, as shown in Fig. 6. Rotation of the control cam 140 continues until limit switch LS-3 is closed and ultimately opens again to open the index relay 121.

The opening of limit switch LS-3 by control cam 140 returns the entire device into its initial position, in which the feeding of the cylinders 76 downwardly begins and thus the beginning of the cycle has again been reached. This cycle is then repeated until the rubber tube T has been cut into the required number of belts.

A modification of the hydraulic power means shown in Fig. 5 is illustrated in Fig. 7. It will be recalled that, in the form shown in Fig. 5, two cutter-carrying cylinders 76 were urged and fed individually downwardly to contact two limit switches LS-1 and LS-2 which, when actuated and closed, stopped the downward feeding movement of the cylinders. The movement of these cylinders 76 was synchronized and balanced by a pressure balance valve 146 so that the cylinders 76 would come down at the same time and travel at the same rates of speed.

The modification shown in Fig. 7 provides for a modified operating means whereby the movement of cylinders 76 is positively synchronized, so that they are moved at the same time and travel with the same rates of speed. It is to be noted that the cylinders carrying the cutters have been illustrated in Fig. 7 in a slightly different manner than that shown in Fig. 5. Reference to Fig. 7 will reveal that the cylinders which were movable in the modification shown in Fig. 5 are now fixed and are referred to by reference numeral 76'. Furthermore, the pistons 79 which were fixed in the modification shown in Fig. 5 are now movable and are referred to by reference numeral 79'. The cutter blades in the modification shown in Fig. 7 are attached to the lower ends of the movable pistons 79', whereas in the modification shown in Fig. 5, the cutters were attached to the lower ends of the movable cylinders 76. This indicates two modifications of cutter-carrying means and either could be used with either modification of the hydraulic power means, as desired.

The various elements shown in Fig. 7 have been illustrated in the positions taken at the beginning of the feed stroke of the pistons 79'. In this position, the pump P is drawing liquid upwardly from a tank or reservoir 153 and urging it upwardly through a relief valve 151 and to a 4-way valve 152 basically similar in construction to 4-way valve 128. It is to be noted that a similar cycle control valve or vent 155 is provided adjacent the relief valve 151, so that the fluid may be diverted, as described previously, and returned to the tank 153, if desired, through tank line 197.

During the feeding stroke of the cutters, as shown in Fig. 7, feed solenoid F1 is energized, and the fluid passes upwardly through the left-hand conduit 158 to sequence valve 159. The motivating fluid passes directly through the sequence valve 159, through a bypass or check valve 171 and into the interior of an indexing cylinder 162 above a movable piston 163. This will force the piston and connecting rod 164 downwardly and cause a counterclockwise movement of the bell crank 166 to back up a pawl 167 idly on a ratchet wheel 168 connected by shaft 168a to gearing 131a. The limit switch LS-4 will thus be opened to its fullest extent and the pawl 167 will complete a full idle backward movement and drop into the next notch on the ratchet wheel to await a later forward work stroke when the bell crank is moved in a clockwise direction. A dial return lock pawl 172 is provided to prevent backward movement of the ratchet wheel 168 during this idle movement of the pawl.

During the backward movement of the pawl 167, the fluid which was originally below the piston 163 will be evacuated through the connecting conduit through a sequence valve 176 and through the 4-way valve 152 into the tank through tank line 177.

When the piston 163 has reached the bottom of its stroke and can go no farther, the fluid will build up a back pressure in the sequence valve 159, actuating the valve spool therein, so that the fluid will be directed through the sequence valve 159 and over into an operating cylinder 180 where it enters the interior of the cylinder to the right of a movable piston 181, as viewed in Fig. 7. Entry of the fluid into the operating cylinder 180 will thus force piston 181 to the left to force the linkages 182, 183, 184 also to the left.

The fluid which was originally to the left of the piston 181 will be displaced backwardly through the metering valve or speed control device 194 and through sequence valve 176 and 4-way valve 152 and be returned to the tank through tank line 177.

Movement of a crossbar 185 secured to these linkages will urge movable pistons 189 in both servo cylinders 190, 190 to the left to urge fluid out of the servo cylinders and up through conduits 81' into the interior of the fixed cylinders 76' wherein it enters above the movable pistons 79' to urge them downwardly to perform a cutting stroke to cut belts from the rubber tube T.

Movement of the linkages 182, 183, 184 of the operating cylinder 180 and the crossbar 185 will continue to the left until the limit switch LS-5 is contacted and closed. This will occur at the extreme left-hand position of the crossbar 185 and of pistons 181, 189 and 189 which corresponds to the lowest position of the pistons 79' and the cutters 71.

When the limit LS-5 is closed, the feed solenoid F1 will be deenergized and the return solenoid F2 will be energized. As a result, the fluid being pumped upwardly to the 4-way valve 152 by pump P will now be directed through the conduit 192 on the right side of the 4-way valve and be directed through the sequence valve 176 and the bypass or check valve 195 and into the interior of the operating cylinder 180 to the left of the movable piston 181 therein. This will cause a movement of the piston 181 to the right which will force the fluid which is located on the right side of the piston to be returned through the conduit back to the sequence valve 159 and through the 4-way valve 152 to be returned to the tank through the tank line 177.

The return movement of the crossbar 185 to the right as viewed in Fig. 7, causes a flow of fluid through the conduits 74' up into the interior of the cylinders 76' and underneath the movable pistons 79' whereby they are urged upwardly in the return cutter stroke. At the same time, the fluid which was originally positioned above the pistons will now be displaced therefrom and be returned through conduits 81' to the left side of the movable pistons 189 in the servo cylinders 190.

The return movement of the cutter knives and the pistons 79' and the crossbar 185 will continue until the pistons 181, 189 in the servo cylinders and the operating cylinder have reached their extreme right-hand position. When this takes place, the fluid which is still being delivered by the pump P will build up a back pressure in the sequence valve 176, actuating the valve spool therein so that the fluid will be urged upwardly into the interior of the index cylinder 162 under the movable piston 163 therein. This will cause an upward movement of the piston 163 and the connecting rod 164 and a corresponding clockwise rotation of the bell crank 166 and pawl 167. In this clockwise movement of the bell crank 166 and pawl 167, the ratchet wheel 168 will be engaged and driven forwardly by the pawl which is in engagement with a notch in the periphery of the ratchet wheel. Rotation of the ratchet wheel will continue until an adjustable stop 174 of the dial index unit is reached. At the same time, the limit switch LS-4 will be closed.

During the upward work stroke of the piston 163 and connecting rod 164 in the index cylinder 162, the fluid which was originally above the piston will be displaced backwardly through the speed control or metering valve 161 and through sequence valve 159 through the 4-way valve 152 and be returned to the tank through tank line 177.

Closing of the limit switch LS-4 will cause the return solenoid F2 to be deenergized and the feed solenoid F1 to be energized, whereby the feeding stroke will be initiated again.

It is to be appreciated that indexing cannot take place during the feeding stroke, due to the fact that the bell crank 166 is rotating idly counterclockwise and the ratchet wheel 168 is being held by the dial return lock. During the return stroke of the cutters and associated elements, indexing cannot take place until the conclusion of the return stroke, inasmuch as the sequence valve 176 will not permit any fluid to enter the index cylinder 162 underneath the movable piston 163 therein until the conclusion of the return movement of the pistons in the operating cylinder and the servo cylinders. This forms a completely regulated system, whereby the indexing cannot take place during the feeding or return strokes of the cutters.

The conduits 196 are inserted, as shown in Fig. 7, to insure the presence of fluid against the sides of the movable pistons 76' at all times. If such means were not employed to create such a constant fluid pressure, and should leakage occur, then lost motion would result in the movement of the pistons. By the use of such conduits, this is avoided and the cylinders are maintained full at all times.

The electrical circuits required for the operation of the hydraulic power means shown in Fig. 7 are illustrated in Fig. 8.

The relative positions of the electrical elements and the corresponding circuits in Fig. 8 have been taken as those existing immediately prior to the commencement of the feeding operation. As shown, the "stop" button is in closed condition, as it normally is, and the "start" button is in open condition, as it normally is. The feed pistons 79' are in their uppermost positions and are in readiness to perform a cutting operation in a downward direction. Limit switch contacts 5B and 4B are open. It is to be noted that these contacts 5B and 4B have counterpart contacts referred to as limit switch contacts 5A and 4A which act oppositely to contacts 5B and 4B, that is, they are open when their counterparts are closed, and vice versa. For purposes of co-relating Figs. 7 and 8, it is to be explained that contacts 5A and 5B of Fig. 8 form the operating parts of limit switch 5 of Fig. 7. Thus, when limit switch 5 is open, as shown, its contact 5B is also open but its contact 5A is closed. Similarly, the contacts 4A and 4B form the operating parts of limit switch 4 so that when limit switch 4 is open, as shown, contact 4B is also open but contact 4A is closed.

When it is desired to start the belt-cutting machine, an operator presses the "start" button momentarily. This closes the circuit containing the feed relay 200 which, when energized, will close the switch 201 associated therewith. Upon the closing of switch 201, both feed relay contacts FR-7 and FR-8 are closed.

Feed relay contact FR-7, when closed, completes a feed relay holding circuit which will hold the feed relay 200 in energized condition even after the "start" button is released. As a result, all that the operator has to do is to press the "start" button for the feed relay to close the switch 201.

When feed relay contact FR-8 closes, it energizes the feed solenoid F1 which is contained within the 4-way valve 152, as shown in Fig. 7. When the feed solenoid F1 is energized, this will cause the fluid to pass through the 4-way valve to deliver the fluid up through the left-hand branch 158 to the cylinder 180 in order to feed the pistons 79' in a downward cutting stroke.

The pistons 79' continue in their downward stroke until limit switch 5 is contacted by the linkages 182, 183, 184 on the operating cylinder 180 and closes. Reference to Fig. 8 will reveal that when the limit switch 5 is thus closed, contact 5B will be closed and contact 5A will be opened. This will open the feed relay holding circuit which was maintaining the feed relay 200 in energized condition so that the feed relay will become deenergized to open the switch 201. When the switch 201 is opened, the feed relay contacts FR-7 and FR-8 also open and the holding circuit is broken and the feed solenoid F1 is deenergized.

At the same time, the limit switch 5 completes the circuit through contact 5B and the return relay 205 which energizes the solenoid contained therein to close the switch 206. When this switch is closed, return relay contacts RR-7 and RR-8 are also closed. Return relay contact RR-7 closes a holding circuit which will maintain the current through the return relay 205 so that even if the limit switch 5 and contact 5B are opened, the current will continue to flow through the return relay 205 to maintain the switch 206 in closed condition.

Return relay contact RR-7 is also closed by the closing of limit switch 5 and permits the current to flow through the return solenoid F2 contained in the 4-way valve 152 to energize the same, whereby the motivating liquid is now sent upwardly through the right-hand conduit 192.

It is to be noted that when the limit switch 5 is closed, contact 5B is closed and the contact 5A is opened to deenergize the feed relay 200 to open the switch 201 and stop the feeding of the device. It is apparent that at no time can both circuits be in operation, that is, the feeding circuit and the return circuit can never be operated at the same time.

As soon as the piston 79' begins its upward return motion, the limit switch 5 is opened. The contact 5A is closed but since the feed relay holding circuit is open at feed relay contact FR-7, the feed relay 200 cannot be energized. However, with respect to the return relay circuit, it will be seen that the opening of the limit switch 5 and of contact 5B does not interrupt the current flowing through the return relay 205, inasmuch as the return relay holding circuit created by return relay contact RR-7 is still closed. Thus, during the return operation, the return relay 205 is energized and closed and the feed relay 200 is deenergized and opened.

The return relay 205 causes the return solenoid F2 to be energized and the pistons 79' continue in their upward motion until they reach their uppermost positions at which time the sequence valve 176 will open to allow the pressure to back up into the index cylinder 162 below the piston 163 and to make an indexing operation. As described in connection with the description of Fig. 7, indexing can only take place upon the full completion of the return movement.

When the dial indexing unit has completed a full indexing cycle and the stop lug 174 has been contacted, the limit switch 4 is closed.

When the limit switch LS-4 is closed, the holding circuit which extends through contact 4A, as shown in Fig. 8, will open and the current will be interrupted through the return relay holding circuit. The switch 206 will open, the return relay contacts RR-7 and RR-8 will be opened and the current through solenoid F2 will be broken. As a result, the return movement is at an end.

At the same time, the limit switch LS-4 and contact 4B closes and completes the circuit carrying the current through the feed relay 200 which is energized to close the switch 201 associated therewith. This is now the beginning of the feed stroke and is the same position that prevailed when the operator pressed the "start" button. The feeding continues, to be followed by the return stroke, and the indexing movement, and the entire cycle is repeated until the rubber tube T has been cut up into the required number of belts.

No particular construction is required for the limit switches and the form shown in Fig. 4 has been found to be thoroughly satisfactory. A contact 49 is adjustably mounted in a bracket 50 secured to the movable plunger cylinder 16. A spring pressed rod 51 is adjustably mounted in a supporting bracket 52 fixedly secured to the stationary side wings 77. The mounting of the spring pressed rod 51 in bracket 52 is such that, when abutted by the movable contact 49, it will slide in the mounting bracket 52 to touch the fixed contact 53 on the side wings 77 and close the desired electrical circuit. Such an adjustable construction provides for the selection of several positions whereby the limit of the movement of the plunger in a downward direction may be carefully controlled and regulated.

As shown in Fig. 9, the inclination of the plunger cylinder 16 may be made adjustable so that a greater variation in sizes and diameters of rubber tubes T may be accommodated by the belt-cutting machine. As shown, a plunger operating mechanism 61' may be pivotally mounted as at 63 on an angular adjusting plate 62 which is bolted or otherwise secured to a mounting bracket 55' which is slidable vertically in the slides or guideways of the cutter supporting carrier, as previously described.

An arcuate slot 68 and associated bolt-clamping means 69 may be used to lock the plunger-operating mechanism 61' in any desired angular relationship whereby a rubber tube of any size or diameter capable of being loaded in the machine may be sliced into belts.

Other variations and modifications may be made within the scope of the foregoing description and the following claims without departing from the spirit of the invention.

I claim:

1. In a belt-cutting machine having a rotatable work-supporting mandrel, a disk-like cutter, means for adjusting the cutter to establish a plane of cutting, means to rotate said cutter in its plane, and a carrier for said rotatable cutter; a plurality of mutually independently adjustable means for the carrier for positioning said cutter with respect to the work, whereby the position and relationship of said cutter to the work on said work-supporting mandrel may be selectively and individually adjusted in any one particular respect without requiring any readjustment of any previously made adjustment of the first adjusting means in any other particular respect.

2. In a belt-cutting machine having a rotatable work-supporting mandrel, a disk-like cutter, means to rotate said cutter in a plane, and a carrier for said rotatable cutter; a plurality of mutually independently adjustable means for said carrier; and means to move said carrier and cutter thereon with a straight line motion without affecting the plane of rotation of said cutter, whereby the cutter remains in its plane of rotation during said straight line movement in cutting into the work on the rotatable mandrel.

3. In a belt-cutting machine having a rotatable work-supporting mandrel, a disk-like cutter and means to rotate said cutter in a plane; a carrier for said rotatable cutter; a pivotally mounted support for said carrier, whereby the plane of rotation of said cutter carried thereon may be angularly adjusted relatively to said mandrel to have the cutter contact the work at a predetermined angle; means to adjust said cutter laterally with respect to said carrier and axially with respect to said mandrel without angularly affecting the plane of rotation of said cutter or the position of said carrier with respect to said mandrel, whereby said cutter will contact the work initially at a predetermined lengthwise point on its periphery; and means to move said carrier and cutter thereon in a rectilinear path without affecting the plane of rotation of said cutter, whereby the cutter remains in its plane of rotation during such rectilinear movement to contact the work initially at the predetermined angle and at the predetermined lengthwise point on its periphery to cut through the work upon continued rectilinear movement of said carrier and cutter thereon.

4. In a belt-cutting machine having a rotatable tube-supporting mandrel, a pair of cutter assemblies of identical construction but arranged oppositely, each of said assemblies including a cutter and means to rotate said cutter in a plane; a carrier for said rotatable cutter; a pivotally mounted support for said carrier whereby the plane of rotation of said cutter carried thereon may be angularly adjusted relatively to said mandrel and said tube supported thereon; means to adjust said cutter laterally with respect to said carrier and axially with respect to said mandrel and said tube supported thereon without angularly affecting the plane of rotation of said cutter or the position of said carrier with respect to said mandrel, whereby said cutter will contact the tube initially at a predetermined lengthwise point on its periphery; and means to move said carrier and cutter thereon in a rectilinear path into the tube without affecting the plane of rotation of said cutter, whereby the respective cutters remain in their respective planes of rotation during such rectilinear movements to contact the tube initially at the predetermined angle and at the predetermined lengthwise points on its periphery to cut a belt therefrom upon continued rectilinear movement of said carrier and cutter thereon.

5. In a belt-cutting machine having a rotatable work-supporting mandrel, a disk-like cutter and means to rotate said cutter in a plane; a carrier for said rotatable cutter; means to adjust said cutter laterally with respect to both said carrier and said mandrel without angularly affecting the plane of rotation of said cutter or the position of said carrier relatively to said mandrel, whereby said cutter may be directed radially toward the center of rotation of said mandrel to contact the work initially at a predetermined circumferential point on its periphery; means to adjust said cutter laterally with respect to said carrier and axially with respect to said mandrel without angularly affecting the plane of rotation of said cutter or the position of said carrier with respect to said mandrel or the circumferential point of initial contact between said cutter and the work, whereby said cutter will contact the work initially at a predetermined lengthwise point on its periphery; and means to move said carrier and cutter thereon in a straight line movement into the work without affecting the plane of rotation of said cutter, whereby the cutter remains in its plane of rotation during such straight line movement to contact the work initially at the predetermined circumferential and lengthwise point on its periphery to cut through the work upon continued straight line movement of said carrier and cutter thereon.

6. In a belt-cutting machine having a rotatable work-supporting mandrel, a cutter and means to rotate said cutter in a plane; a carrier for said rotatable cutter; means to adjust said cutter in a rectilinear plane laterally with respect to both said carrier and said mandrel without angularly affecting the plane of rotation of said cutter or the position of said carrier relatively to said mandrel, whereby said cutter may be directed radially toward the center of rotation of said mandrel to contact the work initially at a predetermined circumferential point on its periphery; means to adjust said cutter in a rectilinear plane laterally with respect to said carrier and axially with respect to said mandrel without angularly affecting the plane of rotation of said cutter or the position of said carrier with respect to said mandrel or the circumferential point of initial contact between said cutter and the work, whereby said cutter will contact the work initially at a predetermined lengthwise point on its periphery; and means to move said carrier and cutter thereon into the work, whereby the cutter contacts the work initially at the predetermined circumferential and lengthwise point on its periphery to cut through the work upon continued movement of said carrier and cutter thereon.

7. In a belt-cutting machine having a rotatable tube-supporting mandrel, a pair of cutter assemblies of identical construction but arranged oppositely, each of said assemblies including a disk-like cutter and means to rotate said cutter in a plane; a carrier for said rotatable cutter; means to adjust said cutter laterally with respect to both said carrier and said mandrel without angularly affecting the plane of rotation of said cutter or the position of said carrier relatively to said mandrel, whereby said cutter may be directed radially toward the center of rotation of said mandrel to contact the tube initially at a predetermined circumferential point on its periphery; means to adjust said cutter laterally with respect to said carrier and axially with respect to said mandrel without angularly affecting the plane of rotation of said cutter or the position of said carrier with respect to said mandrel or the circumferential point of initial contact between said cutter and the tube, whereby said cutter will contact the tube initially at a predetermined lengthwise point on its periphery; and means to move said carrier and cutter thereon in a rectilinear path into the tube without affecting the plane of rotation of said cutter, whereby the respective cutters remain in their respective planes of rotation during such rectilinear movements to contact the tube initially at the predetermined circumferential and lengthwise points on its periphery to cut a belt from the tube upon continued rectilinear movements of said carriers and cutters thereon.

8. In a belt-cutting machine having a rotatable tube-supporting mandrel, a pair of independently operated cutter assemblies of identical construction but arranged oppositely to face one another, each of said assemblies including a disk-like cutter and drive means to rotate said cutter in a plane; a separate carrier for each of said rotatable cutters, the carrier forming the sole support for said cutter; means to adjust said cutter laterally with respect to both said carrier and said mandrel without angularly affecting the plane of rotation of said cutter or the position of said carrier relatively to said mandrel, whereby said cutter may be directed radially toward the center of rotation of said mandrel to contact the tube initially at a predetermined circumferential point on its periphery; means to adjust said cutter laterally with respect to said carrier and axially with respect to said mandrel without angularly affecting the plane of rotation of said cutter or the position of said carrier with respect to said mandrel or the circumferential point of initial contact between said cutter and the tube, whereby said cutter will contact the tube initially at a predetermined lengthwise point on its periphery; means to move said carrier and cutter thereon in a vertical rectilinear path without affecting the plane of rotation of said cutter; and means to synchronize the rectilinear movements of the respective carriers and cutters thereon, whereby the respective cutters are advanced simultaneously into the tube and remain in their respective planes of rotation during such rectilinear movements to contact the tube initially at the predetermined circumferential and lengthwise points on its periphery to cut a belt from the tube upon continued rectilinear movements of said carriers and cutters thereon.

9. The invention as defined in claim 8 wherein the means to move said carrier and cutter thereon includes hydraulic means, and said synchronizing means includes a pressure balance valve to equalize the respective hydraulic moving means.

10. The invention as defined in claim 8 wherein the means to move said carrier and cutter thereon includes hydraulic means, and said synchronizing means includes an operating cylinder and two balanced servo-cylinders to equalize the respective hydraulic means.

11. In a belt-cutting machine having a rotatable work-supporting mandrel, a cutter and means to rotate said cutter in a plane; a carrier for said rotatable cutter; means to adjust said cutter laterally with respect to both said carrier and said mandrel without angularly affecting the plane of rotation of said cutter or the position of said carrier relatively to said mandrel, whereby said cutter may be directed radially toward the center of rotation of said mandrel to contact the work initially at a predetermined circumferential point on its periphery; means to adjust said cutter laterally with respect to said carrier and axially with respect to said mandrel without angularly affecting the plane of rotation of said cutter or the position of said carrier with respect to said mandrel or the circumferential point of initial contact between said cutter and the work, whereby said cutter will contact the work initially at a predetermined lengthwise point on its periphery; means to move said carrier and cutter thereon into the work; and limit means to control the extent of movement of said cutter into the work, whereby the cutter contacts the work initially at the predetermined circumferential and lengthwise point on its periphery to cut through the work to a predetermined limit upon continued movement of said carrier and cutter thereon.

12. In a belt-cutting machine having a rotatable work-supporting mandrel, a disk-like cutter and means to rotate said cutter in a plane; a carrier for said rotatable cutter; means to adjust said cutter laterally with respect to both said carrier and said mandrel without angularly affecting the plane of rotation of said cutter or the position of said carrier relatively to said mandrel, whereby said cutter may be directed radially toward the center of rotation of said mandrel to contact the work initially at a predetermined circumferential point on its periphery; means to adjust said cutter laterally with respect to said carrier and axially with respect to said mandrel without angularly affecting the plane of rotation of said cutter or the position of said carrier with respect to said mandrel or the circumferential point of initial contact between said cutter and the work, whereby said cutter will contact the work initially at a predetermined lengthwise point on its periphery; means to move said carrier and cutter thereon in a rectilinear path into the work without affecting the plane of rotation of said cutter; limit means to control the extent of movement of said cutter into the work; and means to move said carrier and cutter thereon in a rectilinear path out of the work, whereby the cutter remains in its plane of rotation during such rectilinear movements to contact the work initially at the predetermined circumferential and lengthwise point on its periphery to cut through the work to a predetermined limit and to be withdrawn from the work upon continued successive rectilinear movements of said carrier and cutter thereon.

13. In a belt-cutting machine having a rotatable work-supporting mandrel, a disk-like cutter and means to rotate said cutter in a plane; a carrier for said rotatable cutter; means to adjust said cutter laterally with respect to both said carrier and said mandrel without angularly affecting the plane of rotation of said cutter or the position of said carrier relatively to said mandrel, whereby said cutter may be directed radially toward the center of rotation of said mandrel to contact the work initially at a predetermined circumferential point on its periphery; means to adjust said cutter laterally with respect to said carrier and axially with respect to said mandrel without angularly affecting the plane of rotation of said cutter or the position of said carrier with respect to said mandrel or the circumferential point of initial contact between said cutter and the work, whereby said cutter will contact the work initially at a predetermined lengthwise point on its periphery; means to move said carrier and cutter thereon in a rectilinear path into the work without affecting the plane of rotation of said cutter; limit means to control the extent of movement of said cutter into the work; means to move said carrier and cutter thereon in a rectilinear path out of the work, whereby the cutter remains in its plane of rotation during such rectilinear movements to contact the work initially at the predetermined circumferential and lengthwise point on its periphery to cut through the work to a predetermined limit and to be withdrawn therefrom upon continued successive rectilinear movements of said carrier and cutter thereon; and means to advance the carrier and cutter a predetermined distance axially of the mandrel, whereby a new point on the periphery of the work is selected for the rectilinear movements of the cutter into and out of the work.

14. In a belt-cutting machine having a rotatable work-supporting mandrel, a disk-like cutter and means to rotate said cutter in a plane; a carrier for said rotatable cutter; means to adjust the position of said carrier and cutter thereon toward or away from said mandrel without angularly affecting the plane of rotation of said cutter relatively to said mandrel to accommodate work of different diameters; means to adjust said cutter laterally with respect to both said carrier and said mandrel without angularly affecting the plane of rotation of said cutter or the position of said carrier relatively to said mandrel, whereby said cutter may be directed radially toward the center of rotation of said mandrel to contact the work initially at a predetermined circumferential point on its periphery; means to adjust said cutter laterally with respect to said carrier and axially with respect to said mandrel without angularly affecting the plane of rotation of said cutter or the position of said carrier with respect to said mandrel or the circumferential point of initial contact between said cutter and the work, whereby said cutter will contact the work initially at a predetermined lengthwise point on its periphery; and means to move said carrier and cutter thereon into the work, whereby the cutter contacts the work initially at the predetermined circumferential and lengthwise point on its periphery to cut through the work upon continued movement of said carrier and cutter thereon.

15. In a belt-cutting machine having a rotatable tube-supporting mandrel, a pair of cutter assemblies of identical construction but arranged oppositely, each of said assemblies including a cutter and means to rotate said cutter in a plane; a carrier for said rotatable cutter; means to adjust the position of said carrier and cutter thereon toward or away from said mandrel without angularly affecting the plane of rotation of said cutter relatively to said mandrel to accommodate work of different diameters; means to adjust said cutter laterally with respect to both said carrier and said mandrel without angularly affecting the plane of rotation of said cutter or the position of said carrier relatively to said mandrel, whereby said cutter may be directed radially toward the center of rotation of said mandrel to contact the tube initially at a predetermined circumferential point on its periphery; means to adjust said cutter laterally with respect to said carrier and axially with respect to said mandrel without angularly affecting the plane of rotation of said cutter or the position of said carrier with respect to said mandrel or the circumferential point of initial contact between said cutter and the tube, whereby said cutter will contact the tube initially at a predetermined lengthwise point on its periphery; and means to move said carrier and cutter thereon in a rectilinear path into the tube without affecting the plane of rotation of said cutter, whereby the respective cutters remain in their respective planes of rotation during such rectilinear movements to contact the tube initially at the predetermined circumferential and lengthwise point on its periphery to cut a belt from the tube upon continued rectilinear movements of said carriers and cutters thereon.

16. In a belt-cutting machine having a rotatable tube-supporting mandrel, a pair of separate cutter assemblies of identical construction but arranged oppositely to face one another, each of said assemblies including a disk-like cutter and drive means to rotate said cutter in a plane; a separate carrier for each rotatable cutter, said carrier comprising the sole support for said cutter; means to adjust the position of said carrier and cutter thereon toward or away from said mandrel without angularly affecting the plane of rotation of said cutter relatively to said mandrel to accommodate work of different diameters; means to adjust said cutter laterally with respect to both said carrier and said mandrel without angularly affecting the plane of rotation of said cutter or the position of said carrier relatively to said mandrel, whereby said cutter may be directed radially toward the center of rotation of said mandrel to contact the tube initially at a predetermined circumferential point on its periphery; means to adjust said cutter laterally with respect to said carrier and axially with respect to said mandrel without angularly affecting the plane of rotation of said cutter or the position of said carrier with respect to said mandrel or the circumferential point of initial contact between said cutter and the tube, whereby said cutter will contact the tube initially at a predetermined lengthwise point on its periphery; means to move said carriers and cutters thereon in a straight line movement without affecting the planes of rotation of said cutters; and means to synchronize the straight line movements of the respective carriers and cutters thereon, whereby the respective cutters remain in their respective planes of rotation during such straight line movements to contact the tube initially at the predetermined circumferential and lengthwise points on its periphery to cut a belt from the tube upon continued straight line movements of said carriers and cutters thereon.

17. In a belt-cutting machine having a rotatable work-supporting mandrel, a cutter and means to rotate said cutter in a plane; a carrier for said rotatable cutter; means to adjust the position of said carrier and cutter thereon toward or away from said mandrel without angularly affecting the plane of rotation of said cutter relatively to said mandrel to accommodate work of different diameters; means to adjust said cutter laterally with respect to both said carrier and said mandrel without angularly affecting the plane of rotation of said cutter or the position of said carrier relatively to said mandrel, whereby said cutter may be directed radially toward the center of rotation of said mandrel to contact the work initially at a predetermined circumferential point on its periphery; means to adjust said cutter laterally with respect to said carrier and axially with respect to said mandrel without angularly affecting the plane of rotation of said cutter or the position of said carrier with respect to said mandrel or the circumferential point of initial contact between said cutter and the work, whereby said cutter will contact the work initially at a predetermined lengthwise point on its periphery; means to move said carrier and cutter thereon in a rectilinear path into the work without affecting the plane of rotation of said cutter; and limit means to control the extent of rectilinear movement of said cutter into the work, whereby the cutter remains in its plane of rotation during such rectilinear movement to contact the work initially at the predetermined circumferential and lengthwise point on its periphery to cut through the work to a predetermined limit upon continued rectilinear movement of said carrier and cutter thereon.

18. In a belt-cutting machine having a rotatable work-supporting mandrel, a disk-like cutter and means to rotate said cutter in a plane; a carrier for said rotatable cutter; means to adjust the position of said carrier and cutter thereon toward or away from said mandrel without angularly affecting the plane of rotation of said cutter relatively to said mandrel to accommodate work of different diameters; means to adjust said cutter laterally with respect to both said carrier and said mandrel without angularly affecting the plane of rotation of said cutter or the position of said carrier relatively to said mandrel, whereby said cutter may be directed radially toward the center of rotation of said mandrel to contact the work initially at a predetermined circumferential point on its periphery; means to adjust said cutter laterally with respect to said carrier and axially with respect to said mandrel without angularly affecting the plane of rotation of said cutter or the position of said carrier with respect to said mandrel or the circumferential point of initial contact between said cutter and the work, whereby said cutter will contact the work initially at a predetermined lengthwise point on its periphery; means to move said carrier and cutter thereon in a rectilinear path into the work without affecting the plane of rotation of said cutter; limit means to control the extent of movement of said cutter into the work; and means to move said carrier and cutter thereon in a rectilinear path out of the work, whereby the cutter remains in its plane of rotation during such rectilinear movements to contact the work initially at the predetermined circumferential and lengthwise point on its periphery to cut through the work to a predetermined limit and to be withdrawn from the work upon continued successive rectilinear movements of said carrier and cutter thereon.

19. In a belt-cutting machine having a rotatable work-supporting mandrel, a disk-like cutter and means to rotate said cutter in a plane; a carrier for said rotatable cutter; means to adjust the position of said carrier and cutter thereon toward or away from said mandrel without angularly affecting the plane of rotation of said cutter relatively to said mandrel to accommodate work of different diameters; means to adjust said cutter laterally with respect to both said carrier and said mandrel without angularly affecting the plane of rotation of said cutter or the position of said carrier relatively to said mandrel, whereby said cutter may be directed radially toward the center of rotation of said mandrel to contact the work initially at a predetermined circumferential point on its periphery; means to adjust said cutter laterally with respect to said carrier and axially with respect to said mandrel without angularly affecting the plane of rotation of said cutter or the position of said carrier with respect to said mandrel or the circumferential point of initial contact between said cutter and the work, whereby said cutter will contact the work initially at a predetermined lengthwise point on its periphery; means to move said carrier and cutter thereon in a rectilinear path into the work without affecting the plane of rotation of said cutter; limit means to control the extent of movement of said cutter into the work; means to move said carrier and cutter thereon in a rectilinear path out of the work, whereby the cutter remains in its plane of rotation during such rectilinear movements to contact the work initially at the predetermined circumferential and lengthwise point on its periphery to cut through the work to a predetermined limit and to be withdrawn therefrom upon continued successive rectilinear movements of said carrier and cutter thereon; and means to advance the carrier and cutter a predetermined distance axially of the mandrel whereby a new point on the periphery of the work is selected for the rectilinear movements of the cutter into and out of the work.

20. In a belt-cutting machine having a rotatable work-supporting mandrel, a cutter and means to rotate said cutter in a plane; a carrier for said rotatable cutter; a pivotally mounted support for said carrier whereby the plane of rotation of said cutter carried thereon may be angularly adjusted relatively to said mandrel; means to adjust the position of said carrier and cutter thereon toward or away from said mandrel without angularly affecting the plane of rotation of said cutter relatively to said mandrel to accommodate work of different diameters; means to adjust said cutter laterally with respect to both said carrier and said mandrel without angularly affecting the plane of rotation of said cutter or the position of said carrier relatively to said mandrel, whereby said cutter may be directed radially toward the center of rotation of said mandrel to contact the work initially at a predetermined circumferential point on its periphery; means to adjust said cutter laterally with respect to said carrier and axially with respect to said mandrel without angularly affecting the plane of rotation of said cutter or the position of said carrier with respect to said mandrel or the circumferential point of initial contact between said cutter and the work, whereby said cutter will contact the work initially at a predetermined lenghwise point on its periphery; and means to move said carrier and cutter thereon in a rectilinear path into the work without affecting the plane of rotation of said cutter, whereby the cutter remains in its plane of rotation during such rectilinear movement to contact the work initially at the predetermined circumferential and lengthwise point on its periphery to cut through the work upon continued rectilinear movement of said carrier and cutter thereon.

21. In a belt-cutting machine having a rotatable tube-supporting mandrel, a pair of cutter assemblies of identical construction but arranged oppositely, each of said assemblies including a cutter and means to rotate said cutter in a plane; a carrier for said rotatable cutter; a pivotally mounted support for said carrier whereby the plane of rotation of said cutter carried thereon may be angularly adjusted relatively to said mandrel; means to adjust the position of said carrier and cutter thereon toward or away from said mandrel without angularly affecting the plane of rotation of said cutter relatively to said mandrel to accommodate tubes of different diameters; means to adjust said cutter laterally with respect to both said carrier and said mandrel without angularly affecting the plane of rotation of said cutter or the position of said carrier relatively to said mandrel, whereby said cutter may be directed radially toward the center of rotation of said mandrel to contact the tube initially at a predetermined circumferential point on its periphery; means to adjust said cutter laterally with respect to said carrier and axially with respect to said mandrel without angularly affecting the plane of rotation of said cutter or the position of said carrier with respect to said mandrel or the circumferential point of initial contact between said cutter and the tube, whereby said cutter will contact the tube initially at a predetermined lengthwise point on its periphery; and means to move said carrier and cutter thereon in a rectilinear path into the tube without affecting the plane of rotation of said cutter, whereby the cutter remains in its respective plane of rotation during such rectilinear movement to contact the tube initially at the predetermined circumferential and lengthwise point on its periphery to cut a belt from the tube upon continued rectilinear movement of said carrier and cutter thereon.

22. In a belt-cutting machine having a rotatable tube-supporting mandrel, a cutter and means to rotate said cutter in a plane; a carrier for said rotatable cutter; a pivotally mounted support for said carrier whereby the plane of rotation of said cutter carried thereon may be angularly adjusted relatively to said mandrel; means to adjust the position of said carrier and cutter thereon toward or away from said mandrel without angularly affecting the plane of rotation of said cutter relatively to said mandrel to accommodate tubes of different diameters; means to adjust said cutter in a rectilinear path laterally with respect to both said carrier and said mandrel without angularly affecting the plane of rotation of said cutter or the position of said carrier relatively to said mandrel, whereby said cutter may be directed radially toward the center of rotation of said mandrel to contact the tube initially at a predetermined circumferential point on its periphery; means to adjust said cutter in a rectilinear path laterally with respect to said carrier and axially with respect to said mandrel without angularly affecting the plane of rotation of said cutter or the position of said carrier with respect to said mandrel or the circumferential point of initial contact between said cutter and the tube, whereby said cutter will contact the tube initially at a predetermined lengthwise point on its periphery; means to move said carrier and cutter thereon in a rectilinear path without affecting the plane of rotation of said cutter; and limit means to control the extent of rectilinear movement of said cutter into the work, whereby the cutter remains in its plane of rotation during such rectilinear movement to contact the tube initially at the predetermined circumferential and lengthwise point on its periphery to cut through the work to a predetermined limit upon continued rectilinear movement of said carrier and cutter thereon.

23. In a machine tool having work-holding means; a plurality of separate tool carriages; tools mounted on said carriages to perform operations on the work in said holding means, said carriages forming the sole support of the tools; separate power means to feed said tools toward the work in said holding means; equalizing means connected to said power means to synchronize the feeding movements of said tools; limit means to control the extent of the feeding movement of said tools; means responsive to said limit means to reverse the direction of movement of said tools and withdraw the same from the work; delayed sequence indexing means operative upon the conclusion of the reverse movement of the tools to move the same laterally of the work; and limit means to control the extent of the lateral indexing movement of said tools.

24. In a machine tool having work-holding means; a plurality of separate tool carriages; tools mounted on said carriages to perform operations on the work in said holding means, said carriages forming the sole support for the tools; separate power means to feed said tools toward the work in said holding means; equalizing means connected to said power means to synchronize the feeding movements of said tools; limit means to control the extent of the feeding movement of said tools; means responsive to said limit means to reverse the direction of movement of said tools and withdraw the same from the work; delayed sequence indexing means operative upon the conclusion of the reverse movement of the tools to move the same laterally of the work; limit means to control the extent of the lateral indexing movement of said tools; and adjustable control means to vary the rates of the feeding, reversing and lateral movements of said tools.

25. In a machine tool having work-holding means; a plurality of separate tool carriages; tools mounted on said carriages to perform operations on the work in said holding means, said carriages forming the sole support for the tools; separate power means to feed said tools toward the work in said holding means; equalizing means to synchronize the feeding movements of said tools; limit means to control the extent of the feeding movement of said tools; means responsive to said limit means to reverse the direction of movement of said tools and withdraw the same from the work; delayed sequence indexing means operative upon the conclusion of the reverse movement of the tools to move the same laterally of the work; limit means to control the extent of the lateral indexing movement of said tools; and means responsive to said last-named limit means to cause said power means to feed said tools toward the work at a point laterally displaced from the point of the previous feedings of the tools.

26. In a machine tool having work-holding means; a plurality of separate tool carriages; tools mounted on said carriages to perform operations on the work in said holding means, said carriages forming the sole support for the tools; separate hydraulically operable power means including cylinder and piston means connected to each tool to feed said tools toward the work in said holding means; pressure equalizing means connected to said cylinder and piston means to synchronize the feeding movements of said tools; limit means to control the extent of the feeding movement of said tools; means responsive to said limit means to reverse the operation of said cylinder and piston means and the direction of movement of said tools and withdraw the same from the work; delayed sequence hydraulically actuated indexing means operative upon the conclusion of the reverse movement of the tools to move the same laterally of the work; limit means to control the extent of the lateral indexing movement of said tools; and means responsive to said last-named limit means to cause said hydraulically operable power means to feed said tools toward the work at a point laterally displaced from the point of the previous feedings of the tools.

27. The invention as defined in claim 26 wherein said pressure equalizing means includes a pressure balance valve to synchronize the feeding and reverse movements of said tools.

28. The invention as defined in claim 26 wherein said pressure equalizing means includes an operating cylinder and associated therewith a servo-cylinder for each of said tool carriages to synchronize the feeding and reverse movements of said tools.

29. In a machine tool having work-holding means; a plurality of separate tool carriages; tools mounted on said carriages to perform operations on the work in said holding means, said carriages forming the sole support for said tools; an electrohydraulic control system for actuating the tools comprising separate hydraulically operable piston and cylinder means to feed said tools toward the work in said holding means; pressure equalizing means connected to said piston and cylinder means to synchronize the feeding movements of said tools; electric limit switch means connected in said system to control the extent of the feeding movement of said tools; valve means responsive to said limit switch means to reverse the direction of movement of said tools and withdraw the same from the work; hydraulically actuated delayed sequence indexing means operative upon the conclusion of the reverse movement of the tools to move the same laterally of the work; index limit switch means to control the extent of the lateral indexing movement of said tools; means responsive to actuation of said last-named limit switch means to cause said hydraulically operable piston and cylinder means to feed said tools toward the work at a point laterally displaced from the point of the previous feedings of the tools; and adjustable control means connected in the system to vary the rates of the feeding, reversing and lateral movements of said tools.

30. In a machine tool having work-holding means; a plurality of separate tool carriages; tools mounted on said carriages to perform operations on the work in said holding means, said carriages forming the sole support for said tools; an electrohydraulic control system for actuating the tools comprising separate hydraulically operable piston and cylinder means to feed said tools toward the work in said holding means; pressure equalizing means connected to said piston and cylinder means to synchronize the feeding movements of said tools; electric limit switch means connected in said system to control the extent of the feeding movement of said tools; valve means responsive to said limit switch means to reverse the direction of movement of said tools and withdraw the same from the work; hydraulically actuated delayed sequence indexing means operative upon the conclusion of the reverse movement of the tools to move the same laterally of the work; index limit switch means to control the extent of the lateral indexing movement of said tools; means responsive to actuation of said last-named limit switch means to cause said hydraulically operable piston and cylinder means to feed said tools toward the work at a point laterally displaced from the point of the previous feedings of the tools; adjustable control means connected in the system to vary the rates of the feeding, reversing and lateral movements of said tools; and interlock means in the electrohydraulic system to prevent the feeding, reversing and lateral movements from occurring simultaneously.

EDMUND J. LOMAZZO.

References Cited in the file of this patent

UNITED STATES PATENTS

| Number | Name | Date |
|---|---|---|
| 1,086,606 | Merritt | Feb. 10, 1914 |
| 1,721,905 | Hammond | July 23, 1929 |
| 1,864,903 | Gora | June 28, 1932 |
| 1,972,595 | Libby | Sept. 4, 1934 |